United States Patent

[11] 3,553,431

| [72] | Inventor | Christian C. Petersen<br>Westwood, Mass. |
|---|---|---|
| [21] | Appl. No. | 732,289 |
| [22] | Filed | May 27, 1968 |
| [45] | Patented | Jan. 5, 1971 |
| [73] | Assignee | Polaroid Corporation<br>Cambridge, Mass.<br>a corporation of Delaware |

[54] CONTROL SYSTEM FOR A HEATING STATION
15 Claims, 3 Drawing Figs.

| [52] | U.S. Cl. | 219/505 |
|---|---|---|
| [51] | Int. Cl. | H05b 1/02 |
| [50] | Field of Search | 219/501,<br>504, 505, 494 |

[56] References Cited
UNITED STATES PATENTS

| 3,338,476 | 8/1967 | Marcoux | 219/505X |
| 3,437,792 | 4/1969 | Lauck | 219/505 |
| 3,456,096 | 7/1969 | Bilbro | 219/501 |
| 3,307,167 | 2/1967 | Race | 338/23X |

*Primary Examiner*—Bernard A. Gilheany
*Assistant Examiner*—Bell F. E.
*Attorneys*—Brown and Mikulka, William D. Roberson and Gerald L. Smith

ABSTRACT: A control system for regulating the power input to the heating station of a processing device. The system utilizes a gated, full wave thyristor to regulate an AC power input to an electrical heating element. The heating element is selected having a relatively low mass to provide fast speed heat-up to target temperatures. A positive temperature coefficient thermistor is positioned in thermal bond with the heating element and is used in conjunction with an RC storage arrangement to gate the full wave control thyristor.

INVENTOR.
*Christian C. Petersen*
BY
*Brown and Mikulka*
and
*Gerald L. Smith*
ATTORNEYS

CONTROL SYSTEM FOR A HEATING STATION

BACKGROUND OF THE INVENTION

A variety of sophisticated materials processing systems have been proposed by industry which require, as a processing step, a regulated heat input over a relatively short time interval. To provide this thermal input, it is usually convenient to insert within the systems electric heating elements whose currents are controlled in response to the measured temperature of a heated environment. As the processing systems have become more intricate, the performance criteria imposed upon such heating elements and their related control functions correspondingly have become more exacting. Design parameters frequently encountered in this field include, inter alia, such requirements as high speed or accelerated heat-up to a target temperature or temperature profile; accurate maintenance of predetermined target temperature levels once they are initially achieved; maintenance of these target temperatures under widely varying line voltage inputs; rapid accommodation to quenching or heat drains imposed by the system process; and resilience to the stresses and strains induced by the thermal cycling encountered in sequential operation.

Two techniques are generally employed for regulating the current input into heating elements. In one arrangement, a thermostat control switches current on when the temperature of the heated environment drops to a given point. The thermostatic device functions to turn current off again when the temperature rises above a preselected level. For applications where target temperature levels are critical, this form of control will usually derive unwanted temperature excursions alternately above and below the critical level. Such temperature deviation is induced as a result of a thermal inertia within the object being heated. Typically, when current to the heating element is cut off, the temperature within the object continues to rise, and, conversely, the temperature continues to fall for a finite period after current is turned on.

A second current regulating technique, generally referred to as a servocontrol, functions to vary the current input to the heating element in accordance with the amount by which the temperature of the heated object differs from a target temperature level or value. As the temperature of the heated environment approaches this value, the servoregulated input current to the heating element is gradually diminished until target level is attained. Conversely, as the temperature of the heated environment departs from target level, the servoregulated current to the heating element is gradually increased. With the servoarrangement, temperature excursions may be maintained within acceptable ranges. Generally, the continuously variable current control function of these servodevices has been provided by regulating the conductance of vacuum tubes or semiconductive units inserted in series with the heating element. These units impose an approximately linear line current attenuation as target temperatures are approached. The control circuitries have been somewhat typified as rather elaborate networks having correspondingly elevated production costs.

For heat regulating applications requiring a high speed or rapidly accelerative heat-up, in addition to requiring an acceptable immunity from thermal excursions at target temperature levels, conventional servoregulating schemes have been found inadequately responsive. The desirably accurate temperature control derived through their progressive diminution of line current is achieved at the expense of relatively lengthened heat-up intervals. Similarly, the system may be slow in reacting to provide higher current flow for accommodating any sudden quenching or heat dumping within the heated environment. This time consuming gradual control may be inadequately responsive to power gains or losses occasioned by line voltage variations. Where the use of heating elements of relatively low mass is contemplated, the effects deriving from the operating variables as above discussed will be accentuated.

SUMMARY OF THE INVENTION

The invention now presented provides a temperature control system which serves to maintain an object or heated environment at preselected or target temperature levels. In addition to deriving an accurate temperature level control, the system of the invention is characterized in achieving target temperature levels within relatively short heat-up time intervals.

The present control system is further characterized by its rapid rate of corrective response to quenching or rapid heat drains within the temperature controlled environment. Additionally, the system advantageously accommodates line voltage variations while maintaining its desirably abbreviated reaction or heat-up time intervals.

This characteristic rapid response of the instant control system is achieved while desirably avoiding thermal excursions above or below target temperature levels.

An important application to which the present temperature control system is addressed lies in the document copying field. The application contemplating its use provides a drying station through which dampened photosensitive sheets are passed. This station utilizes a low mass heating element powered by an AC source. By virtue of the present invention, the heating element may be heated to a critical target level temperature within an abbreviated time interval. As the moistened photographic sheet material is passed through the drying station, the control system of the invention rapidly accommodates a resultant heat dumping within the drying station. By reason of its immunity from line voltage variations, the inventive system is capable of maintaining the required short interval heat-up period of the dryer while operating with a wide range of voltage levels. As a result of this voltage variation accommodation, such processing systems may enjoy a broader spectrum of reliable application.

Characterized, inter alia, by the incorporation of a positive temperature coefficient thermistor as a heat sensing element within the heated environment, the system of the invention functions to anticipate and restrict line input currents at the approach of target temperature levels while still providing rapid heat-up rates at temperature levels substantially near target levels.

The invention is further characterized in its advantageously simple design and structure. As a result, the control system lends itself to relatively inexpensive fabrication techniques while maintaining desirable reliabilities.

Other objects of the invention will in part be obvious and will in part appear hereinafter.

The invention accordingly comprises the features of construction, combination of elements and arrangement of parts which will be exemplified in the construction hereinafter set forth.

For a fuller understanding of the nature and objects of the invention, reference should be had to the following detailed description taken in connection with the accompanying drawings.

DETAILED DESCRIPTION OF THE DRAWINGS

Temperature control systems designed in accordance with the present invention advantageously function to achieve target level temperatures within the heated environment of a processing station with not only accuracy but also considerable rapidity. The desirability of these features becomes particularly apparent when the system is incorporated within the drying station of a photocopying device as is described in a copending application for patent entitled "Paper Transport System" under the inventorship of Richard J. Chen, Nicholas Gold and Paul B. Mason Ser. No. 722,853, filed Apr. 22, 1968, now U.S. Pat. No. 3,536,401 and assigned in common herewith. Such photocopying machines generally function to expose a photosensitized sheet of paper at a first station. This exposed sheet is then passed within a conveyor system into an imbibition station at which position it is wetted with a liquid developing agent. From the imbibition station, the conveyor system passes the wetted and now image-carrying sheet through a dryer station. At the dryer station, excess moisture is removed from the sheets and a completed, usable copy is available following its egress therefrom.

To remain practical and appropriately competitive, the exposed sheets must be moved through the various stations of the copy machine with reasonable rapidity. For example, the drying station may typically be reached by the exposed paper sheets within about 9 seconds.

Such rapid manipulation initially requires that the dryer station achieve an appropriate drying temperature level within that same 9 seconds. Further, the maximum temperature levels required of this moisture removing process must be somewhat closely adhered to. It will be apparent that the quality of the paper or the chemically derived image upon its surface will be adversely affected by an excessive thermal input.

As moistened image-carrying paper sheets are moved through the dryer station, there is created a somewhat abrupt heat drain, which, without further adjustment will engender a considerable temperature drop across the heating unit. For conventional electric heating units, a correction for this quenching action is supplied by a higher power contribution. This power input must be inserted quickly in order to maintain adequate temperature levels. Additionally, the corrective input must be such as to avoid thermal inertial surges over maximum temperature limits.

Figure 1:
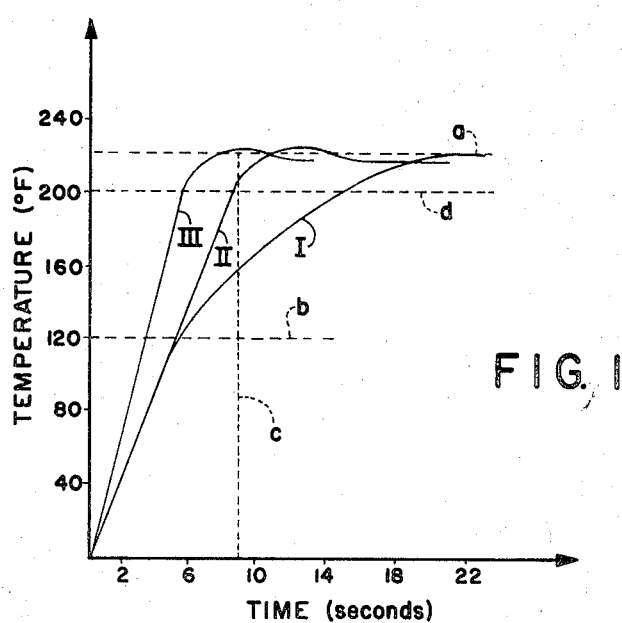
FIG. 1 is a graph showing the effect of a series of line input voltages upon heating unit output by illustrating the intervals required to achieve target temperatures.

The somewhat linear control imposed by conventional servosystems upon electrically powered heating elements is illustrated by a curve I shown in FIG. 1. It may be noted from examination of this curve that a temperature target level, $a$, of about 220° F. is approached very gradually from a temperature level $b$. This gradual approach to desired temperature extends over a considerable temperature range as is apparent from the temperature differential between levels $a$ and $b$. Further examination of curve I will reveal that this progressive diminution of input current with temperature elevation evolves an inherently lengthened heat-up interval. In the present illustration, a 9-second maximum heat-up period (line $c$) will be exceeded by the system of curve I in achieving target level $a$. Should a sudden temperature drop be encountered as by quenching, the servosystem of curve I will be slow to react in supplying added power to the heating element.

Under the present control system, high power input is supplied to the heating element up to temperatures relatively close to those at target level. The approximate termination of this lengthened power input is indicated at level $d$ and the system will be seen to provide temperature outputs represented at curves II and III. Note that temperature buildup along these curves is very rapid and within the time limitation at line $c$. Once above level $d$, however, the curves taper rapidly to avoid an excessive override above target level $a$.

Figure 2:
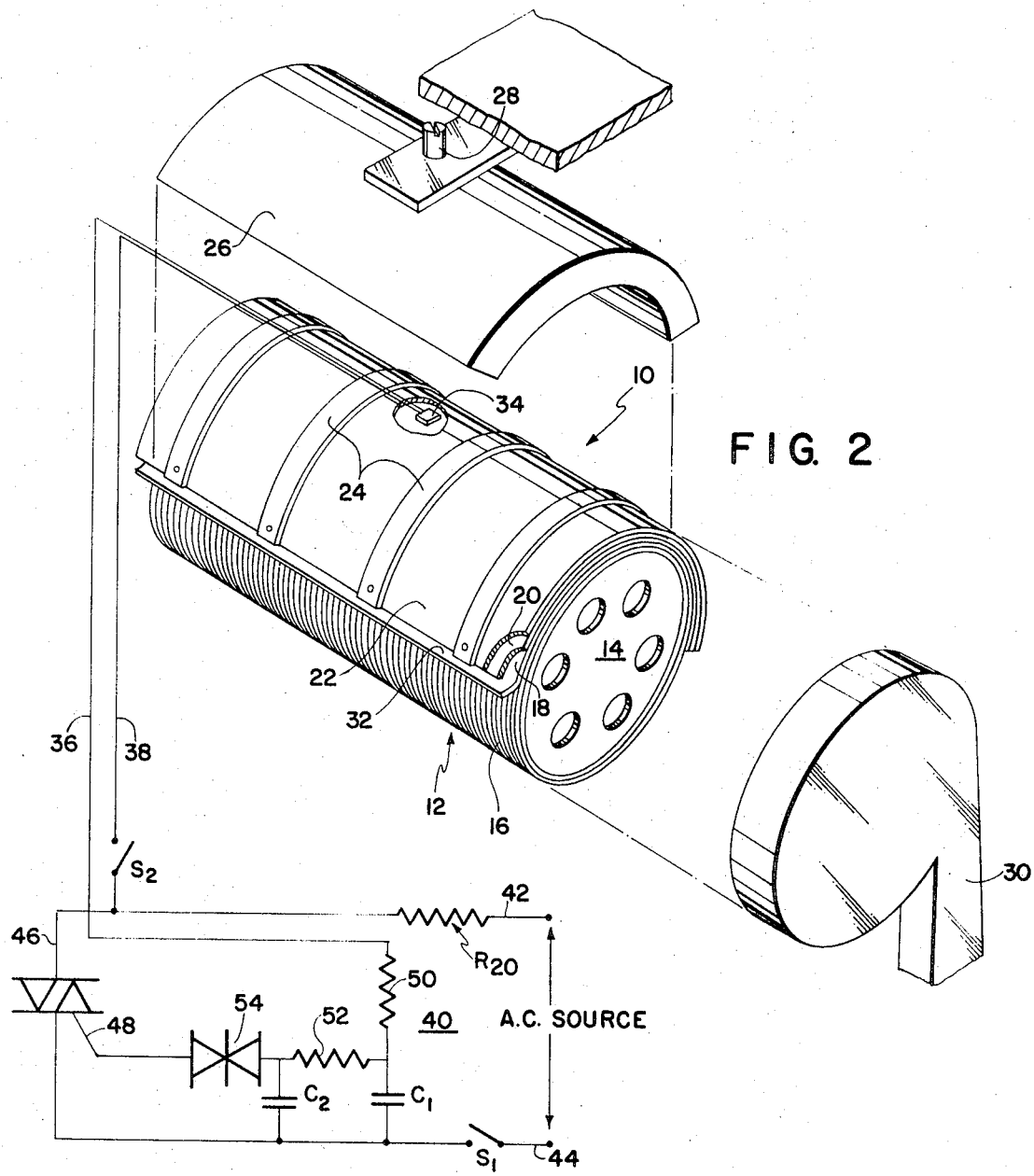
FIG. 2 is a partially pictorial and partially schematic diagram of a temperature control system incorporated within the dryer station of a copier machine according to the present invention.

Turning now to a more detailed description of the heating element and control system, FIG. 2 illustrates an exemplary dryer station 10 formed of a perforated hollow cylindrical member 12 which is rotatable about its longitudinal axis by driving means, not shown. The ends of the member 12 are provided with end plates 14, each of which is apertured to allow for the passage of exhausted air through the interior of the cylinder. A layer of porous, compliant material, the outer periphery of which is wound with a pile fabric 16 forms the longitudinal surface of the cylinder.

Mounted above and in slidable contact with cylindrical member 12 is a heater assembly. The heater assembly is formed having a platen 18 fashioned from stainless steel sheet. Upon platen 18 there is intimately connected sheet form heating element 20 extending over the length of the cylinder. Heating element 20 is retained in position with an insulative asbestos layer 22 and series of strap members 24. The platen 18-heating element 20 assembly is urged against surface 16 of the cylinder by a pressure plate assembly 26. Adjustment of the pressure exerted by the assembly 26 is provided by a machine screw 28. A duct 30 is positioned against end plate 14 of the cylinder for purposes of receiving and carrying off a flow of air passing through the entire assembly.

In operation, the leading edges of dampened image-carrying photographic paper sheets are introduced into the dryer beneath a deflected lip portion 32 of platen 18. The cylinder 12 is caused to rotate in clockwise direction, thereby drawing the sheets between the pressurized interface of the assembly. As each photographic sheet passes through the arrangement it is heat dried by virtue of an AC current input to the resistive heating element 20. The temperature or temperature profile across the heating element is monitored by a sensing device 34 which is a thermistor of the positive temperature coefficient (PTC) variety. Positioning of the PTC thermistor 34 is a matter of design choice. The device is shown in metallically bonded contact with heating element 20 at about its midpoint. Depending upon the thermal characteristic desired to be measured, the sensor 34 may be positioned at the leading or trailing edge of the element 20 and may be fixed to portions of the assembly other than the surface of the heating element itself. The thermally dependent resistances derived at the sensor 34 are used, ultimately, to control the power input into heating element 20.

Looking to the circuitry 40 within which PTC thermistor 34 is inserted, basic power is supplied heating element 20, now identified as a resistor $R_{20}$, from an AC source at lines 42 and 44. This AC input to the heater $R_{20}$ is basically controlled by a gated bidirectional thyristor 46. Commonly referred to as a "Triac," the thyristor 46 is a three terminal full wave AC control device which is triggered into conduction at a gate 48. The remainder of the circuitry at 40 functions to convert the resistance present at element 34 into a phase chopping control input to gate 48. Accordingly, upon the closure of line switches $S_1$ and $S_2$ a low monitoring resistance at 34 will combine from line 36 with a limiting resistor 50 to charge capacitor $C_1$. This RC circuit will charge swiftly to derive a voltage which is introduced through limiting resistor 52 to a trigger 54. Trigger 54 is illustrated as being of the bilateral variety which conducts upon receipt of a selected forward breakover or switching voltage. In conventional manner, the RC circuit and bilateral triggering arrangement function to gate the thyristor 46 in correspondence with the value of resistance at 50 and $R_{20}$. The value of resistance at 50 is selected for the purpose of imposing a limit on the conduction angle at thyristor 14.

To improve circuit performance, an AC suppressor branch including a capacitor $C_2$ and resistor 52 is inserted to discriminate against noise otherwise encountered in the overall circuitry. In the same regard, a dual switching arrangement is provided. The circuit is energized by a sequential closing of switch $S_1$ and then switch $S_2$. With the above closing sequence, line switch $S_1$ will be closed while thyristor 46 is in a blocking or off state. Such a blocking status will serve to eliminate high current flow and preserve the contacts at switch $S_1$.

Figure 3:
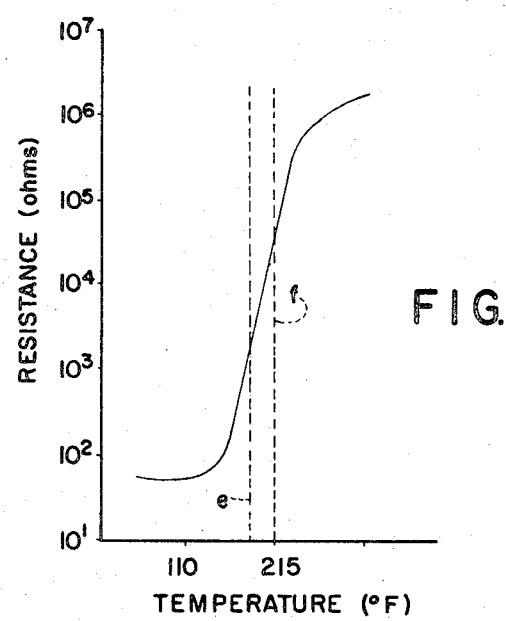
FIG. 3 is a resistance-temperature characteristic curve for a positive temperature coefficient thermistor which may be incorporated with the circuitry of FIG. 2.

The conductance of thyristor 46 will be dependent upon the resistance evolved at thermistor 34. A typical resistance-temperature characteristic curve for the sensor is illustrated in FIG. 3. Note from this curve that the value of resistance of the element will rise very rapidly when it is heated to within about 20° F. of target level temperature. Such a threshold level is indicated on the drawing by a dashed line $e$ situated at the knee of the curve. Until this threshold is reached, the resistance value of the element remains very low. As a result, the thyristor 46 is gated to permit a maximum power input to the heating element $R_{20}$ until a temperature very close to the target level is reached. Between the threshold level and target temperature level $f$, the resistance of the PTC thermistor rises very rapidly. Note that the temperature level at $f$ corresponds with that at $a$ and lies upon the steep portion of the characteristic curve. This rapid rise serves to cause the gating circuitry to severely limit the conduction at thyristor 46. Note that the temperature interval $e-f$ over which this high resistance is derived is relatively small.

Looking to the operation of the circuit, upon the closing of switches $S_1$ and $S_2$ the resistance value of PTC thermistor 34 will remain very low until the temperature threshold level $e$ is reached. The low value of resistance will permit maximum conduction at triac 46 and effect a maximum heat buildup rate at heating element $R_{20}$. Beyond the temperature threshold level $e$, maximum resistance is reached with extreme rapidity, thereby, dropping the conduction or "on-time" of triac 46 to a minimum value. At this time, the temperature at $R_{20}$ will level off at about target temperature and the value of resistance at 34 will recede to a level which may be considered a stable posture lying on the steepest portion of the curve at FIG. 3. The latter resistance value will evoke sufficient conduction at triac 46 for maintaining the target level temperature.

As a moist, image-carrying paper sheet is introduced into the heating station, a temperature quenching action will ensue. Inasmuch as the above noted stable point of resistance lies upon the steepest portion of the characteristic curve of FIG. 3, PTC thermistor 34 will react very rapidly to provide a buttressing power input through triac 46 and into heating element $R_{20}$. As a result, requisite target temperature levels advantageously are maintained. It will be apparent that following an accommodation of the above described quenching action, the resistance of the PTC sensor 34 will rise extremely fast as before to restrict heating element temperatures to requisite target levels.

Returning to FIG. 1, the heat-up time-temperature curves further illustrate the versatility of the instant invention. Under an accurately regulated conventional line voltage depicted, for instance, along a curve as at III, the heating unit will reach the target temperature level shown at dashed line $a$, well within a requisite time interval, the terminus of which is indicated at dashed line $c$. Should the line voltage fall below its rated value, the heater will achieve target temperatures along a curve typically represented at II, still within the required time interval. Using conventional sensing techniques, curve I would be followed under the same diminished line voltages. As illustrated, the latter curve will not reach target temperature within the required time interval.

From the foregoing comparison it will be seen that the rapid response characteristic of the control circuit affords a versatility of effective heater operation under a diversity of power supplies. The circuitry permits an application of full power to the heating element until threshold temperature is reached. In addition to the advantages, rapid response rate and relative immunity from voltage variation, the control system serves to anticipate temperature target levels and thereby avoid unwanted thermal excursions.

In addition to its ideal simplicity, a further examination of the circuitry described above shows that the accurate and rapidly responsive control system operates without the use of amplification stages. This facet of the invention will be recognized as representing unique advantage.

The invention additionally has been shown to provide a novel association of a sensitive low mass heating unit of relatively low thermal inertia with a corresponding highly sensitive control technique. This combination provides a uniquely desirous performance for a process heating station which must achieve target temperature levels or profiles within relatively short time intervals and under variable line input voltages. The combination also provides for a rapid accommodation of the quenching action often encountered at such heating stations.

Since certain changes may be made in the above system and apparatus without departing from the scope of the invention, it is intended that all matter contained in the above description or shown in the accompanying drawings shall be interpreted as illustrative and not in a limiting sense.

I claim:

1. A control system for raising the temperature of an electrical heating element of relatively low mass and relatively high thermal response to and maintaining its temperature near a predetermined level within a short time interval comprising:
   a source of alternating current power;
   gated full wave control means connected between said power source and said heating element for varying the electrical power applied to said element;
   nonlinear resistor means arranged in temperature sensing relationship with said heating element and having a resistance-temperature characteristic evidencing low resistance values at temperatures below a region encompassing a narrow span of temperatures substantially near said predetermined level and evidencing a rapid rate of increase of resistance values within said region; and
   triggering means responsive to said resistance values and coupled with said control means gate for causing its cyclical activation in correspondence with the values of said resistance in a manner wherein said control means is activated to cause relatively lower power insertion into said heating element at temperatures within said region near said predetermined head and is activated to cause relatively higher power insertion into said heating element at temperatures within said region remote from said predetermined level.

2. The control system of claim 1 wherein said power source is selected within a predetermined voltage range and said heating element is selected having a mass permitting its energization to evolve said temperature level by said source within said short time interval.

3. The control system of claim 1 wherein said resistor means is arranged in thermal bond with the heated environment of said heating element.

4. The control system of claim 1 wherein said resistor means is connected in thermal bond with said heating element.

5. The control system of claim 1 wherein said resistor means is selected as a positive temperature coefficient thermistor.

6. The control system of claim 1 wherein said gated full wave control means comprises a solid state, three-terminal, bidirectional thyristor.

7. The control system of claim 1 wherein said triggering means includes capacitor means coupled in charging relationship with said nonlinear resistor means and adapted to gate said control means when charged to selected voltage levels.

8. The control system of claim 7 wherein said capacitor means is coupled with a gating means connected to activate said control means upon receipt of said selected voltage level.

9. The control system of claim 8 wherein said gating means is a bilateral trigger.

10. The control system of claim 1 including:
    first switching means connected between said power source and said control means; and
    second switching means connected between said source and said triggering means.

11. The control system of claim 1 wherein said control means comprises:
    a solid state, three-terminal, bidirectional thyristor; and
    said triggering means includes capacitor means coupled in charging relationship with said nonlinear resistor means and gating means coupled between said capacitor means and said control means gate for activating said control means upon receipt of a predetermined voltage.

12. The control system of claim 1 wherein:
    said power source is selected within a predetermined voltage range;

said heating element is selected having a mass permitting its energization to evolve said temperature level by said source within said short time interval;

said nonlinear resistor means is selected as a positive temperature coefficient thermistor; and said temperature region encompasses a substantially narrow span of temperature.

13. The control system of claim 12 wherein said gated full wave control means comprises a solid state, three-terminal, bidirectional thyristor.

14. The control system of claim 1 wherein:

said heating element is selected having a relatively low mass so as to permit its heat-up to said predetermined level within said short time interval;

said resistor means is selected as a positive temperature coefficient thermistor;

said temperature region encompasses a substantially narrow span of temperature; and said triggering means includes capacitor means coupled in charging relationship with said positive temperature coefficient thermistor and adapted to gate said control means when charged to selected voltage levels.

15. The control system of claim 14 wherein said capacitor means is coupled with a gating means connected to activate said control means upon receipt of said selected voltage level.